(12) United States Patent
Rensel et al.

(10) Patent No.: US 8,286,473 B2
(45) Date of Patent: Oct. 16, 2012

(54) AIR SPRING HAVING WIRELESS MICRO AND NANO SENSORS

(75) Inventors: John D. Rensel, Tallmadge, OH (US); Paul B Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 12/943,999

(22) Filed: Nov. 11, 2010

(65) Prior Publication Data

US 2011/0083500 A1    Apr. 14, 2011

Related U.S. Application Data

(60) Continuation-in-part of application No. 12/501,638, filed on Jul. 13, 2009, now Pat. No. 7,832,263, which is a division of application No. 11/739,847, filed on Apr. 25, 2007, now Pat. No. 7,581,439.

(60) Provisional application No. 60/794,605, filed on Apr. 25, 2006.

(51) Int. Cl.
     *G01M 17/02*  (2006.01)
(52) U.S. Cl. .......................................... 73/146
(58) Field of Classification Search .......... 73/146–146.8
     See application file for complete search history.

(56) References Cited

U.S. PATENT DOCUMENTS

| | | | |
|---|---|---|---|
| 4,648,622 A * | 3/1987 | Wada et al. ............... | 280/5.519 |
| 2003/0046992 A1 | 3/2003 | Caretta | |
| 2003/0201044 A1 | 10/2003 | Schick | |
| 2004/0196147 A1 | 10/2004 | Albuquerque | |
| 2004/0216520 A1 | 11/2004 | Caretta | |
| 2004/0239504 A1 | 12/2004 | Kalinin et al. | |
| 2005/0204806 A1 | 9/2005 | Brusarosco et al. | |
| 2005/0234613 A1 | 10/2005 | Brusarosco et al. | |
| 2006/0017553 A1 | 1/2006 | Cook | |
| 2007/0028679 A1 | 2/2007 | Stoila et al. | |
| 2007/0029027 A1 | 2/2007 | Stoila et al. | |
| 2007/0131035 A1 | 6/2007 | Krutz et al. | |
| 2007/0251619 A1 | 11/2007 | Bertrand | |
| 2007/0256485 A1 * | 11/2007 | Rensel et al. ............. | 73/146 |
| 2007/0295069 A1 | 12/2007 | Mancosu et al. | |

(Continued)

FOREIGN PATENT DOCUMENTS

DE    101 35 883    5/2003

(Continued)

OTHER PUBLICATIONS

EP Search Report, EP Application No. 10 01 2616, Dec. 8, 2010.

(Continued)

*Primary Examiner* — Andre Allen

(57) ABSTRACT

A sensor system for obtaining data from an air spring having elastomeric body with a plurality of wireless sensors embedded therein. The sensor length-scales range from nano- to micro-scale devices that are small enough to avoid becoming occlusions within the elastomeric body. The air spring may include a spring wall having an internally reinforced elastomeric body portion with the sensors embedded within. The air spring may include a spring wall having an unreinforced elastomeric body portion with the sensors embedded within. The sensors may be configured to provide data related to one or more of temperature, pressure, sidewall flex, stress, strain and other parameters. The sensors may be LCD sensors, and/or conductive polymer sensors, and/or bio-polymer sensors and/or polymer diodes suitable for sensing data during the operation of the air spring.

20 Claims, 3 Drawing Sheets

U.S. PATENT DOCUMENTS

| | | | |
|---|---|---|---|
| 2009/0277262 A1 | 11/2009 | Rensel et al. | |
| 2010/0139413 A1 | 6/2010 | Herrmann et al. | |
| 2010/0320703 A1* | 12/2010 | Lin et al. ............ | 280/5.507 |

FOREIGN PATENT DOCUMENTS

| | | | |
|---|---|---|---|
| EP | 0828087 | | 3/1998 |
| EP | 1 431 741 | | 6/2004 |
| EP | 1 522 425 | | 4/2005 |
| EP | 1 526 366 | | 4/2005 |
| JP | 59100007 A | * | 6/1984 |
| JP | 2003-205718 | | 7/2003 |
| JP | 2005186658 | | 7/2005 |
| JP | 2006099757 | | 4/2006 |
| WO | WO 03/095245 | | 11/2003 |
| WO | WO 03/105511 | | 12/2003 |
| WO | WO 2006/098840 | | 9/2006 |

OTHER PUBLICATIONS

EP Search Opinion, EP Application No. 10 01 2616.

Wessel, R. "Nordic Researchers Aim for Multiprotocol Multisensor RFID Tag," RFID Journal, Jan. 19, 2007 (www.rfidjournal.com/article/articleview/2985/).

International Search Report, Feb. 1, 2008.

"Siemens aims to reinvent auto wheel (really)," Designfax Online, Dec. 28, 2006.

IST Project Fact Sheet: "Intelligent tyre for accident free traffic (APOLLO)," Information Society Technologies, date of publication unknown, project start date Mar. 1, 2002.

IST Final Report: "Intelligent tyre for accident free traffic," Information Society Technologies, Jul. 25, 2005 (http://virtual.vtt.fi/apollo/deliverables/apollo_final%20report.pdf).

Intelligent Tyre Systems—State of the Art and Potential Technologies: "Intelligent tyre for accident free traffic," Information Society Technologies, May 22, 2005.

Intelligent Tyre Promoting Accident-free Traffic, Information Society Technologies, date unknown (http://virtual.vtt.fi/apollo/objectives/proiect_presentation.pdf).

"Friction: On-board Measurement of Friction . . . to Enhance the Performance of Integrated Cooperative Safety Systems," Information Society Technologies, May 2006 (www.esafetysupport.org/download/related_projects/friction.pdf).

"Friction: On-board Measurement of Friction and Road Slipperiness to Enhance the Performance of Integrated Cooperative Safety Systems," information Society Technologies, date unknown—possibly 2004, (http://friction.vtt.fi/friction_presentation.pdf).

Lee Chang Won, International Search Report and Written Opinion, Jun. 8, 2012, pp. 1-10, Korean Intellectual Property Office.

* cited by examiner

AIR SPRING HAVING WIRELESS MICRO AND NANO SENSORS

CROSS REFERENCE TO RELATED APPLICATION

This application is a continuation-in-part application of U.S. application Ser. No. 12/501,638, filed Jul. 13, 2009 which is a divisional of U.S. Pat. No. 7,581,439, issued Sep. 1, 2009 which claims the benefit of U.S. Provisional Patent Application Ser. No. 60/794,605 filed Apr. 25, 2006; the disclosures of each are hereby totally incorporated by reference herein.

BACKGROUND OF THE INVENTION

1. Technical Field

The present exemplary embodiment relates to air springs with elastomeric bodies having integrated sensor systems. It finds particular application in conjunction with monitoring physical and engineering properties of the air spring with embedded micro/nano-sized sensors, and will be described with particular reference to vehicle air springs. However, it is to be appreciated that the subject matter of the present disclosure is also amenable to other applications and environments, and that the specific uses shown and described herein are merely exemplary. For example, the subject matter of the present disclosure could be used in air springs for transportation vehicles, height adjusting systems and actuators associated with industrial machinery, and/or other such equipment.

2. Background Information

It is well known that land vehicles of most types and kinds are outfitted with a suspension system that supports a sprung mass (e.g., a body or chassis) of the vehicle on an unsprung mass (e.g., axles or wheel-engaging members) of the vehicle. It is also well known for some suspension systems to include air spring devices that are operatively connected between the sprung and unsprung masses of the vehicle. Typically, such air spring devices include two relatively rigid end members that are sealingly connected to respective open ends of a flexible spring wall to at least partially form a spring chamber therebetween.

The spring wall of a conventional gas load bearing device is adapted to flex during dynamic operation and use of the air spring device and is therefore normally made from a flexible, elastomeric material. During operation, the air spring device is loaded such that opposing forces act against the end members. It is well recognized in the art that the flexible spring wall does not itself support the load. Rather, the pressurized gas retained within the gas spring device by the spring wall acts against the end members and thereby provides forces capable of supporting loads applied to the end members.

The result of the work performed by the viscoelastic materials can be indicated by temperature, a thermodynamic quantity, as a measure of the useful work lost to heat. Air springs are designed to withstand repeated internal and external forces and the resulting temperatures within an operational window at various loads and internal pressures. When an elastomeric article experiences conditions beyond this operational window, the performance of the article can be shortened. For example, in some situations, a vehicle air spring that is being improperly used may include components that are subjected to excessive shear forces during use (e.g.: repeated cyclic deformation). These internal forces generate heat that will raise the internal temperature of the air spring. Overheated air springs may eventually break down and impair the air spring performance.

Today's vehicles also include actively-managed suspension and braking systems. These systems infer or assume data about the relationship between the air spring and the road surface. Vehicle manufacturers desire a system to obtain measurable real-time engineering data from the air spring so that these data may be used to actively manage the vehicle's operation.

It is therefore desirable to sense parameters experienced by the air springs such as forces including stresses and strains, temperatures, vibrations, and other conditions to provide useful information concerning the status of the air spring and its components.

SUMMARY OF THE INVENTION

One example of a sensor system in accordance with the subject matter of the present disclosure is described for obtaining data from an elastomeric article in the form of an air spring having an elastomeric spring wall from a plurality of sensors disposed within the spring wall. The sensor system obtains the data through wireless communications. The sensors are micro-scale or nano-scale sensors that are sufficiently small to be embedded within the article. Such sensors may be configured in combination with the elastomeric material to be sufficiently small to avoid being occlusions in the elastomeric material.

One example of the present disclosure provides an elastomeric article in the form of an air spring having an elastomeric spring wall having a plurality of sensors embedded within the spring wall. The sensors are micro-scale or nano-scale in size. At least a plurality of sensors are configured to provide a wireless signal to a reader to provide physical property data or engineering condition data of the spring wall. One configuration provides the plurality of sensors embedded throughout the elastomeric materials of the spring wall. Another configuration provides the sensors in a sensor layer that are built into the spring wall.

In a further configuration, the present disclosure provides an air spring having an elastomeric spring wall having a plurality of sensors configured to change their configuration upon reaching a threshold. In one example, the threshold is temperature-based. Other thresholds include stress, strain, and vibration. The sensor system can include a reader programmed to look for changes in the sensor configuration. Exemplary changes in sensor configuration can include the sensors activating, deactivating, changes to transmission frequency, or altering the time between transmissions.

BRIEF DESCRIPTION OF THE DRAWINGS

Similar numbers refer to similar parts through the specification. The drawings are intended to be schematic or pictorial representations. The drawings are not to scale, the sensors are not to scale, and the cross hatching selected for the drawings is not intended to limit the materials.

DETAILED DESCRIPTION

Figure 1:
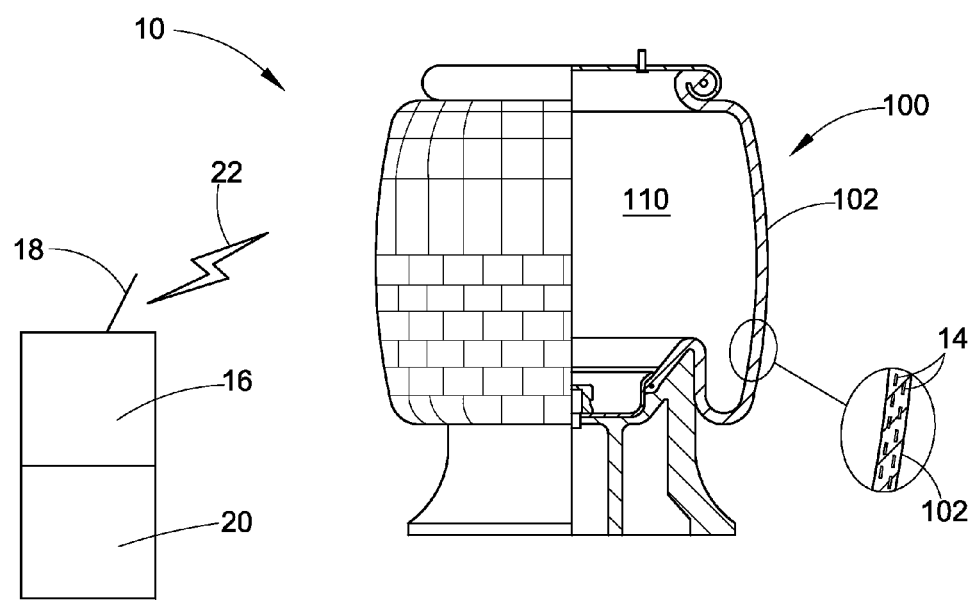
FIG. 1 is pictorial block diagram illustrating a monitoring system in accordance with the invention.
Figure 1A:
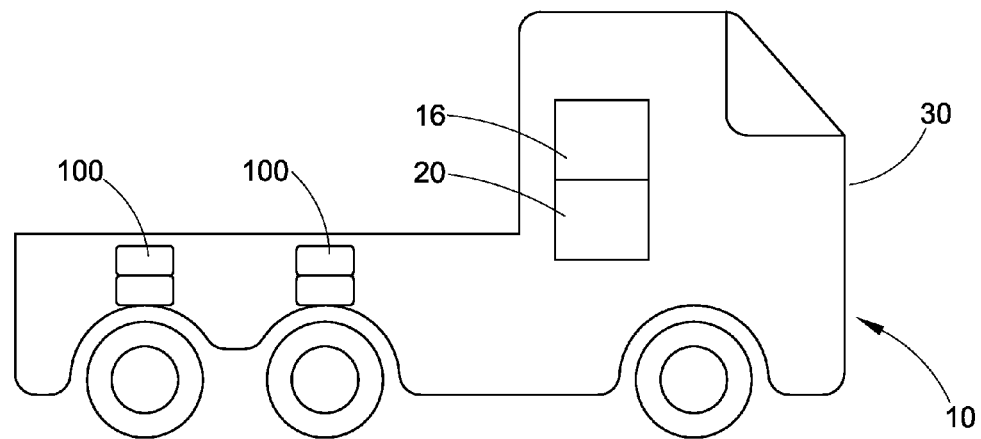
FIG. 1A is a view of a vehicle having an active suspension system incorporating the monitoring system of the invention to provide data to the suspension system.

With reference to FIGS. 1 and 1A, a remote sensing system for an air spring 100, also known as a gas spring, is shown generally at 10. The sensing system 10 includes one or more wireless sensors 14 embedded in the elastomeric spring wall 102, also known as the bellows or flexible sleeve, of an air spring 100 for sensing various parameters including but not limited to temperature, pressure, air pressure, stress, strain, vibration, chemistry, among others. The sensing system 10 obtains data useful for monitoring air spring properties or characteristics including, but not limited to, air spring pressure, temperature, elastomeric body integrity and flex characteristics. Non-uniformities in the elastomeric spring wall 102 can also be monitored and/or discovered such as bulges and broken ply.

The wireless sensors 14 provide sensed data to a data collection device 16, also known as a reader or data acquisition circuit, which is located remotely from the sensors. The data collection device 16 can be mounted in or on the air spring 100, in or on the vehicle, or remote from both such as in a test stand installation. The wireless sensors 14 provide data in the form of electromagnetic sensor signals that can be read by the data collection device 16 in a wireless manner thereby avoiding the need for a physical connection between them. The wireless communication between sensor 14 and collection device 16, shown at 22, provides a great degree of versatility in mounting the sensor to the air spring or embedding the sensor within the air spring.

The air spring 100 can be a vehicle air spring for use in a wheeled vehicle 30, shown in FIG. 1A. The vehicle 30 can include an active suspension, such that suspension controls receive information or data from reader 16 or processor 20 and uses this information as part of the control calculations for the suspension. These data and information may be stored over time to create a history of the operational life of the air spring 100. The air spring history information may be used to modify the design of future air springs.

The data collection device 16 can include an antenna 18 for receiving the sensed data in the form of electromagnetic radiation, such as for example radio wave transmissions as shall be described in further detail below. A single collection device 16, or a plurality of collection devices, can be used to collect the data sensed by the wireless sensors 14. A relay mechanism also may be used wherein the relay mechanism gathers data from the air spring and relays the data to a collection device 16. A plurality of relays may be used. In one configuration, a relay may be disposed in the air spring or near the air spring while the collection device 16 is carried by the vehicle or disposed at a fixed location.

A data processor 20 can be connected to the data collection device 16 for processing the sensed data in order to synthesize information about the air spring properties being monitored. The data processor 20 can be a computing device including but not limited to a dedicated processor, a conventional computer such as a personal computer or laptop, or other known electronic devices for collecting and processing signals obtained from wireless sensors. The one or more collection devices 16 can be disposed apart from one or more central processing devices 20 or integrated therewith.

The data collection device 16 and data processor 20 can be disposed on or in the vehicle 30 for providing sensed data and processed determinations about the air spring or vehicle in real time, if so desired. Alternatively, a test stand including these devices 16 and 20 can be configured to provide this data during air spring testing.

Sensors 14 may be non-silicon based, such as LCD sensors, conductive polymer sensors, or bio-polymer sensors of various shapes, examples of which can include rods, spheres, etc. Sensors 14 also may be polymer diodes having the advantage of providing data at low frequencies. Low frequencies enable the sensor outputs to travel through thicker mediums and as such these types of sensors can be embedded throughout a greater range of the elastomeric material of the body of the air spring, such as being embedded deeper within the air spring flexible sleeve as described below, while still providing usable data which can be detected remotely. The wireless sensors 14 also may be Radio Frequency IDentification (RFID) devices providing their sensed data to the one or more suitable collection devices. Such RFID devices are fabricated in small enough sizes to be incorporated in large numbers into an air spring 100. Large numbers of RFID devices may thus be incorporated into the elastomeric spring wall 102 body to provide feedback from a wide area of the air spring.

When sensors 14 are embedded within the elastomeric spring wall 102, each sensor 14 is sufficiently small to avoid being an occlusion at the embedded location, examples of which are provided in further detail below. An occlusion is a foreign material embedded in an elastomer that does not have similar physical properties as the surrounding elastomer. An occlusion leads to undesirable performance of the elastomer. Sensors 14 may be on the micro- and nano-scale to avoid being occlusions depending on the properties of the sensor and the properties of the material surrounding the sensor. In one example, each sensor is no larger than 20 microns. Depending on where the sensors are disposed, other sizes of individual sensors can range from tens to hundreds of square millimeters in size down to smaller sizes similar to that of carbon black to down to even smaller sizes in microscopic range.

Wireless sensors 14 may include functions beyond "identification" or "acknowledgement" of the sensor 14 as is commonly known with RFID tags. The wireless sensors 14 may sample and/or measure parameters such as temperature, pressure, air pressure, stress, strain, vibration, chemistry, among others. These data may be used by data collection device 16 and data processor 20 to generate information about the air spring 100. When data are obtained in real time, the generated information may be used as part of a feed back loop with the controller for the vehicle's suspension.

The sensors 14 can be sampled repeatedly, to obtain the relative strength of the sensed signal emanating from each sensor to create a map of the air spring spring wall structure. This map may be compared to an initial map of the air spring generated and stored when the air spring is placed into service. The initial map may be stored with reference to a unique air spring identification number disposed on a RFID chip in the air spring or stored with the sensors. Changes in the signal strength or data from one or more of the areas of the map may indicate changes in particular locations of the elastomeric spring wall 102 of the air spring. These changes can include temperature changes, strain changes, stress changes, and pressure changes either within the spring chamber 110 or within the structure of the elastomeric spring wall 102 itself. When used with an air spring suspension system, the changes can be used to alter the suspension setup.

The wireless sensors 14 can be passive sensors which do not include a power source and active transmitter. The passive sensors 14 can be inductively coupled with the data collection device. The sensors 14 include one or more conductive elements 114 forming one or more antennas which receive electromagnetic waves emitted from the collection device antenna 18. This radiation is converted into electricity that can power the electronic devices forming the sensors enabling the sensors to sense the requisite data and transmit it back to the collection device 16.

The passive sensors 14 can also be coupled with the data collection device 16 by backscatter coupling which uses the power reflected from the sensor that is radiated into free space. A small proportion of this power is picked up by the collection device's antenna 18 traveling in the "backwards direction" from the sensor 14 and can be decoupled using a directional coupler and transferred to the receiving input portion of the data collection device.

The sensors 14 can also be powered by other sources of energy including those generated by the air spring itself. The system can include a power circuit using energy scavenged from the energy generated by the air spring, its mounting assembly, or other related parts, into electrical for providing power to the one or more sensors. For example piezo-electrical circuits, or other known energy scavenging circuits available from Siemens Technology or Seiko, such as the Kinetic Power Source, can be used which convert energy from the flexing sidewall into electrical energy to power the sensor. Other energy scavenging or harvesting devices are disclosed in patent publications assigned to EnOcean GmbH. This electrical energy can also power a transmitter circuit included with the sensor 14 that is used for sending the sensed data acquired by the sensor back to the data collection device 16.

This system 10 can use a carrier frequency determined by the collection device 16. Different carrier frequencies can be used to provide distinction among sensors 14, or different classes of sensors, so that each can provide data simultaneously. Similarly, various known modulation techniques can also be used to enable such simultaneous data collection. The wireless sensors 14 can also be active sensors including integrated power sources.

The bandwidth used for transmitting the sensed information to the collection device 16 can be low frequencies such as in the kilohertz to hundreds of kilohertz, high frequencies in the megahertz range, ultra-high frequencies in the hundreds of megahertz, and microwave frequencies in the gigahertz range. Ultra wide band communication techniques may be used to transmit data from sensors 14 to reader 16.

Figure 2:
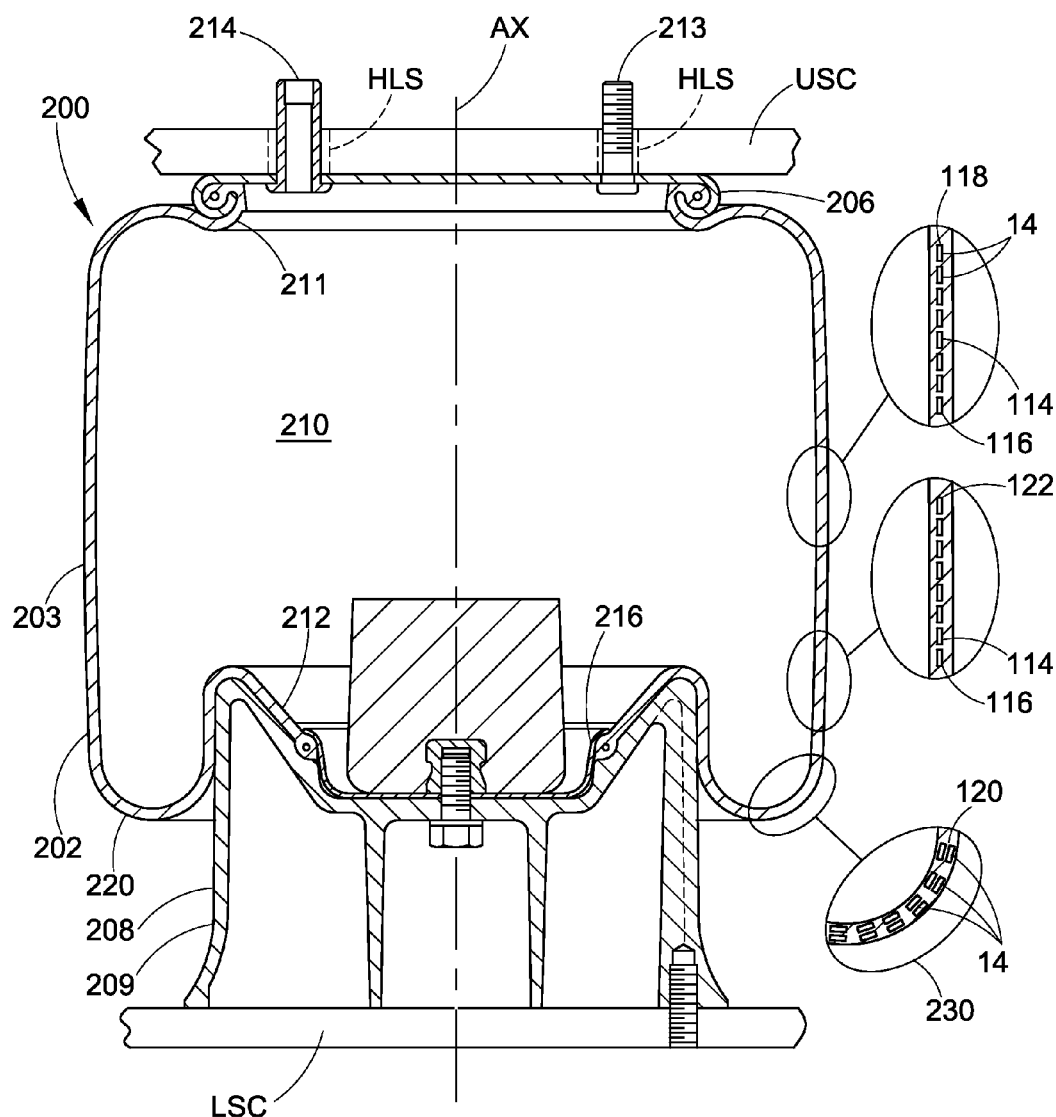
FIG. 2 is a sectional view of an air spring having an unreinforced spring wall with an elastomeric body including a plurality of sensors embedded therein.

FIG. 2 illustrates an exemplary air spring 200, referred to as a rolling lobe air spring, that includes an spring wall 202 having an elastomeric portion in the form of an elastomeric body 203 disposed between an first or upper end member 206 and an opposing second or lower end member 208 that is spaced from the first end member. The spring wall body 203 includes opposing first 211 and second 212 open ends, the first end being secured to the first member 206 and the second end being secured to the second member 208 in a known manner. The spring wall 202 at least partially defines an spring chamber 210 disposed within it and between the upper and lower end members. In this example of a rolling lobe air spring 200, which should not be considered limiting, the spring wall body 203 is unreinforced such that it does not include reinforcing plies or other reinforcing structures disposed within the spring wall. However, it should be appreciated that the rolling lobe air spring 200 can be a reinforced rolling lobe air spring having one or more reinforcing structures such as plies disposed within the spring wall body 203 with sensors 14 embedded in one or more layers thereof, in a similar manner as the reinforced convoluted air spring illustrated in FIG. 3 discussed below.

The air spring 200 is disposed between opposing structural components, such as upper and lower structural components USC and LSC of an associated vehicle 201, for example. In this example, the air spring 200 is shown as having a longitudinal axis AX and the first end member is a top or bead plate 206, for example, that is adapted for securement on or along the upper structural component USC. The first end member 206 can be secured along the structural component in any suitable manner, such as for example, by using one or more threaded mounting studs 212 that extend through corresponding mounting holes HLS in one of the associated structural components (e.g., upper structural component USC).

In this example, the second end member is a piston 208, that is longitudinally spaced from the first end member 206 and that is adapted for securement on or along the lower structural component LSC, for example. Again, it will be appreciated that the second end member can be operatively connected to or otherwise secured on or along the structural component in any suitable manner.

Piston 208 includes a piston body 209 and can also, optionally, include one or more additional components and/or elements, such as a lower bead plate 216 for securing it to the lower end of the elastomeric spring wall 202, though it should be appreciated that the piston can be secured to the spring wall in a variety of different manners.

The air spring 200 can include an air inlet 214 for providing gas to chamber 210 or evacuating gas therefrom to change the pressure of the gas within the chamber.

In use, a portion of spring wall body 203 forms a rolling-lobe 220 that is displaced along the outside wall of the piston 208 as the air spring undergoes changes in overall height, such as, for example, may be due to variations in load conditions applied thereto, as is well understood by those of skill in the art. As a result, the rolling lobe 220 experiences forces during operation. Thus, sensors 14 can be placed in the elastomeric body 203 at the rolling lobe 220 as shown at 230 to monitor one or more of the stress, strain, temperature and the physical integrity of this portion of the elastomeric spring wall 202.

Figure 3:
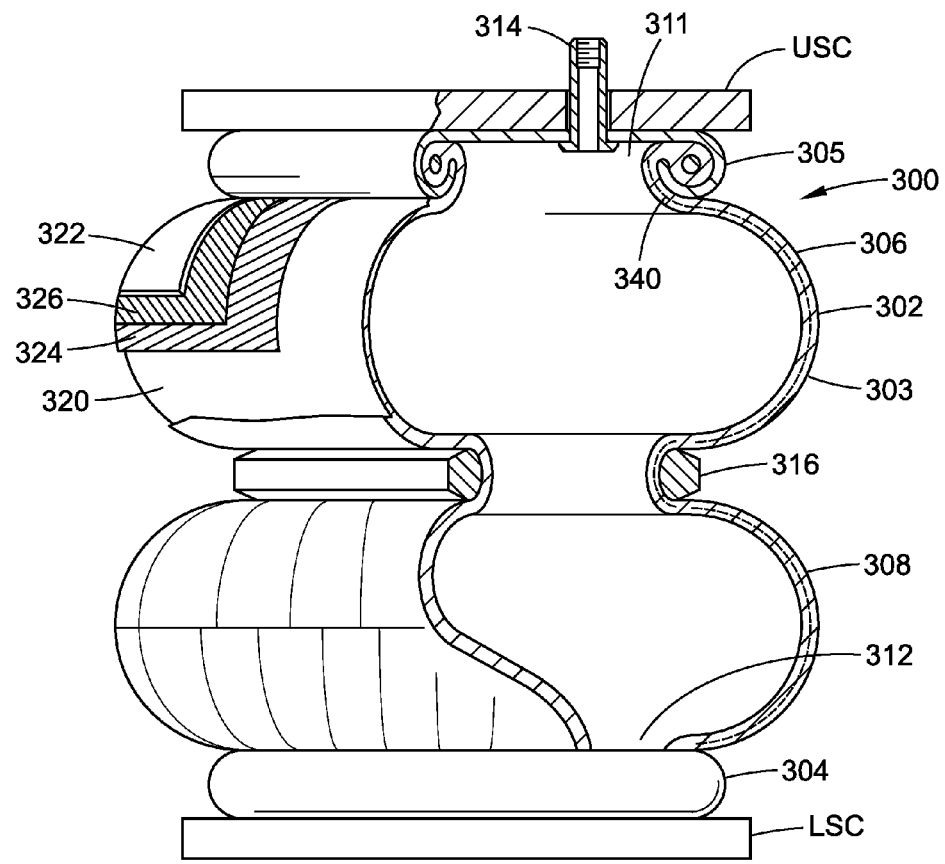
FIG. 3 is a sectional view of an air spring having an internally reinforced spring wall with one or more elastomeric bodies having a plurality of sensors embedded therein.

Another exemplary embodiment of an air spring in accordance with the present disclosure is illustrated generally at 300 in FIG. 3. The air spring 300 is shown disposed between opposing upper and lower structural components USC and LSC which can be structural components of a vehicle, for vehicular air springs, or other structural components, such as components of industrial machinery, for air springs which are not vehicular air springs. The air spring 300 includes a spring wall 302 having a spring wall body 303 extending between opposing first and second end members 304 and 305 defining a gas filled spring chamber 310 therebetween. The opposing end members 304, 305 can be respectively secured along lower and upper structural components LSC and USC in any suitable manner. The spring wall is a convoluted elastomeric wall 302 having a first spring portion 306 and a second spring portion 308 that are shown as having opposing open ends 311 and 312 that are respectively secured along end members 304 and 305 in a suitable manner, such as by using a crimped connection, for example. The air spring 300 can include an air inlet 314 for providing gas to chamber 310 or evacuating gas therefrom to change the pressure of the gas within the chamber.

A girdle hoop 316 encircling the spring wall 302 between the first and second spring portions 306 and 308 approximately midway between the end members 304 and 305 can be used. It will be appreciated that girdle hoop 316 can be formed from the same material as one or more of the portions of the flexible spring walls and can include a wire wound circumferentially about the spring wall 302 and molded within. The first and second spring portions form an air spring having two bellows or convolutions. However, it will be appreciated that additional spring portions can optionally be included to form additional bellows or convolutions.

Figure 4:
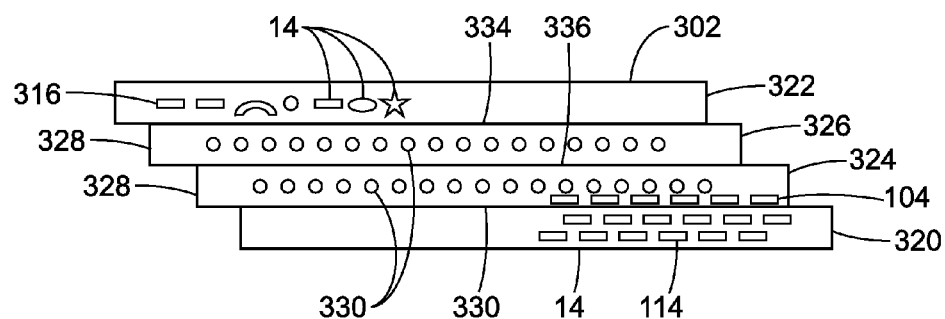
FIG. 4 is an enlarged sectional view of a portion of an internally reinforced air spring spring wall having one or more elastomeric bodies having a plurality of sensors embedded therein.

As shown in FIGS. 3 and 4, the air spring 300 is a reinforced air spring having internal reinforcement in the form of one or more plies of reinforcing material disposed within the spring wall 302 to withstand the forces applied thereto by the aforementioned pressurized gas under load. In one example, which should not be considered limiting, the reinforced air spring 300 includes spring wall 302 having an inner layer 320, an outer layer 322 and first 324 and second 326 plies disposed between the inner layer and outer layer. The inner layer 302 and outer layer are formed of an elastomeric material. The first and second plies 324 and 326 include elastomeric material 328 having internal reinforcing structures 330 in the form of reinforcement filaments or cords such as substantially inelastic filaments (e.g. fibers, strands, yarns and threads) and/or plies of fabric, or other sections of material made therefrom that are embedded within the layer of elastomeric material 332 to help restrict or otherwise limit the expansion thereof. Exemplary "substantially inelastic filaments" include cotton yarns, nylon cords, aramid fibers, and metal, such as steel. Such internal reinforcement acts to buttress the elastomeric material of the spring wall and thereby help to restrict the expansion of the same, both under internal design pressures and under dynamic pressure levels associated with use under load. However, it should be appreciated that the convoluted air spring 300 can be an unreinforced air spring such that it does not include reinforcing structures such as plies disposed within the spring wall 302.

The micro-scale or nano-scale sensors 14 can be embedded within the elastomeric material of the air spring 100, 200, 300, such as for example in the elastomeric spring wall 102, 202, 302, by adding them to the elastomeric materials during the manufacturing process. In one embodiment, the sensors 14 are added to the elastomeric materials during the last step of mixing prior to formation of the elastomeric spring wall. These sensors 14 then become randomly distributed throughout the elastomeric material of the air spring wall, as shown for example at 102 in FIG. 1. The sensor-laden materials are then used to construct the spring wall components of the air spring.

The sensors 14 may also be arranged in a sensor layer 116 embedded within spring wall 100, 200, 300 in a purposefully-arranged manner or a random manner. The sensor layer 116 may form an array. The sensor array can be a two dimensional array 118 (1 sensor thick having a width and length) or a three dimensional array 120 (multiple sensors thick having a length and width). The sensor layer 116 may be formed by printing techniques using conductive inks on an elastomeric or a plastic substrate that may be incorporated into the air spring elastomeric spring wall 102, 202, 302 during the air spring build process. An air spring circuit of independent or related sensors 14 may be printed on such a substrate. In addition, conductive polymers may be employed for creating these circuits, or for antenna structures or sensing elements within the air spring.

The sensor layer 116 may be continuous or a combination of separated patches of sensors 14. The layer 116 may define a sensor mesh 122 having a plurality of openings that allows adjacent elastomeric materials to touch each other through the layer, such as direct bonding during the cure step of the associated elastomeric material.

FIG. 4 depicts exemplary configurations of an internally reinforced air spring 300 having a spring wall 302 with an internally reinforced elastomeric spring wall body 303 having a plurality of sensors 14 embedded within it. Examples of these configurations can include the sensors 14 embedded in the inner layer 320, the outer layer 322, or both. Other examples can include the sensors 104 being embedded in the elastomeric material 328 of one or more of the spring wall body plies 324, 326. Other examples can include the sensors being embedded in or at the interface 332 between the inner layer 320 and the adjacent ply 324. Other examples can include the sensors being embedded in or at the interface 334 between the outer layer 322 and the adjacent ply 326. Other examples can include the sensors being embedded in or at the interface 336 between the plies 324 and 326. The sensors 14 can be embedded in the elastomeric material by curing them with the elastomeric material, or within the elastomeric material. The sensors 104 can also be embedded within spring wall body 203, 303 at the open ends 211, 212, 311, 312 adjacent the attachment to the end members 211, 212, 311, 312.

For example, stress and strain sensors 14 can be used to monitor the spring wall 102, 202, 302. In another example depicted in FIG. 2, temperature sensors 14 may be used to monitor temperatures.

When sensors 14 are disposed in the spring wall 102, 202, 302 the work and/or energy created in the spring wall can be monitored in this manner to record an operating history of the air spring 100, 200, 300. The data processing device 110 can use this data to determine if these sensed parameters have exceeded the preferred operating conditions of the air spring and provide such an indication to an operator. The preferred operating conditions may be determined by running a similar air spring on controlled test equipment to establish acceptable ranges of data from the sensors 14. These acceptable ranges may be used by the data processing device to monitor air spring conditions.

In one exemplary configuration, an air spring includes sensors 14 that are configured to become active or deactivate at a threshold temperature. Exemplary threshold temperature can include 100 degrees Celsius, though it should be appreciated that other threshold temperatures may be used. The threshold temperature is designed to correspond to an undesirable temperature or a temperature that is somewhat below an undesirable temperature in the area of the elastomeric material of the air spring 200 where these particular sensors 14 are located. Another exemplary threshold temperature can be −40 degrees Celsius, or other temperatures at or near the brittle point of the elastomeric material of the air spring. The particular temperature depends on the air spring design and air spring components. When the system is configured in this manner, if the reader suddenly loses (in the case of deactivation) or gains (in the case of activation) a percentage of the acknowledgement signals from these sensors 14, then this will indicate the threshold temperature has been reached at a location in the air spring 200 having the sensors 14. When sensors 14 are disposed in a layer adjacent a component of the spring wall 102, 202, 302, then the system 10 will indicate the threshold temperature has been reached at that location. The software may then create an appropriate indication (either to the user of the vehicle, the owner of the vehicle, the maintenance shop, or the manufacturer of the air spring via network communications). One example is to locate a plurality of sensors adjacent to the reinforcing belt ends. These sensors would be configured to stop providing a signal (or an acknowledgement) at a threshold temperature somewhat below a temperature that is experienced during air spring damage. If the threshold temperature is reached and the sensors stop delivering responses, then the user of the vehicle may be warned to have the air spring replaced or to have the air spring system serviced.

In another configuration, the sensors may be configured to transmit one signal (either a readable signal or a lack of a signal) when subjected to vibrational levels within a defined acceptable range. If the sensors consistently experience vibration levels outside of this range, they transmit a different signal (a different readable signal such as one at a different frequency, they turn on, or they turn off) to indicate a change in the vibration levels inside the air spring body.

In another configuration, the sensors 14 are adapted to transmit at one frequency (or range of frequencies) at a range of normal air spring operating temperatures. When the temperature experienced by the sensors falls outside the range, the sensors transmit at a different frequency indicating the change of temperature in the air spring body.

The exemplary embodiment(s) described herein have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An air spring comprising:
   a first end member;
   a second end spaced apart from the first end member;
   a spring wall extending between the first and second end members, the spring wall at least partially defining a gas filled spring chamber disposed between the first and second end members, the spring wall including an elastomeric body; and
   a sensor layer disposed within the elastomeric body of the spring wall and including a plurality of micro-scale sized or smaller sensors each providing wireless signal data related to one or more physical properties of the air spring, wherein the sensors are sufficiently small to avoid becoming an occlusion in the elastomeric body.

2. The air spring of claim 1, wherein the spring wall is an unreinforced spring wall having an elastomeric spring wall body with the sensor layer disposed within the elastomeric spring wall body.

3. The air spring of claim 1, wherein the spring wall includes an internally reinforced spring wall body including an elastomeric outer layer having the sensor layer disposed within the outer layer.

4. The air spring of claim 1, wherein the spring wall includes an internally reinforced spring wall body including an elastomeric inner layer having the sensor layer embedded within the outer layer.

5. The air spring of claim 1, wherein the spring wall includes an internally reinforced spring wall body including a ply layer having an elastomeric material with internal reinforcing structures, wherein the sensor layer is disposed within the elastomeric material of the ply layer.

6. The air spring of claim 1, wherein the spring wall includes an elastomeric body forming a rolling lobe having the sensor layer disposed within the rolling lobe.

7. The air spring of claim 1, wherein the spring wall includes an elastomeric body having a first open end secured to the first end member and a second open end secured to the second end member, wherein the sensors are disposed within the elastomeric body at at least one of the open ends.

8. The air spring of claim 1, wherein the sensor layer includes sensors are adapted to provide data about at least one physical property of the air spring including temperature, stress, strain, shear, vibration, or chemistry.

9. The air spring of claim 1, wherein the sensor layer has a circuit formed of conductive inks on an elastomeric or plastic substrate.

10. The air spring of claim 1, wherein the sensor layer comprises a mesh of sensors having openings allowing elastomeric materials adjacent the layer to extend through the layer.

11. The air spring of claim 1, wherein the sensor layer comprises an array of sensors one sensor thick.

12. The air spring of claim 1, wherein the sensor layer comprises an array of sensors multiple sensors thick.

13. The air spring of claim 1, wherein the sensors are randomly distributed throughout the sensor layer.

14. The air spring of claim 1, wherein the embedded sensors are cured with the elastomeric body.

15. The air spring of claim 1, wherein the embedded sensors are cured within the elastomeric body.

16. The air spring of claim 1, wherein the sensors are one of an LCD sensor, a conductive polymer sensor, a bio-polymer sensor, and a polymer diode.

17. An air spring comprising:
   a first end member;
   a second end member spaced apart from the first end member;
   a spring wall extending between the first and second end members, the spring wall at least partially defining a gas filled spring chamber disposed between the first and second end members, the spring wall including an elastomeric body; and
   a plurality of micro-scale sized or smaller sensors providing wireless signals providing data related to at least one physical property of the air spring, the sensors embedded within the elastomeric body, each sensor having a size similar to carbon black or smaller thereby being sufficiently small enough to avoid being an occlusion.

18. The air spring of claim 17 wherein the sensors are randomly distributed.

19. The air spring of claim 18, wherein the sensors are cured within the elastomeric body or cured with the elastomeric body.

20. The air spring of claim 17 wherein the sensors are one of an LCD sensor, a conductive polymer sensor, a bio-polymer sensor, and a polymer diode.

* * * * *